No. 826,404. PATENTED JULY 17, 1906.
G. CODY.
SEWER BACKWATER AND TESTING TRAP.
APPLICATION FILED JAN. 20, 1905. RENEWED APR. 4, 1906.
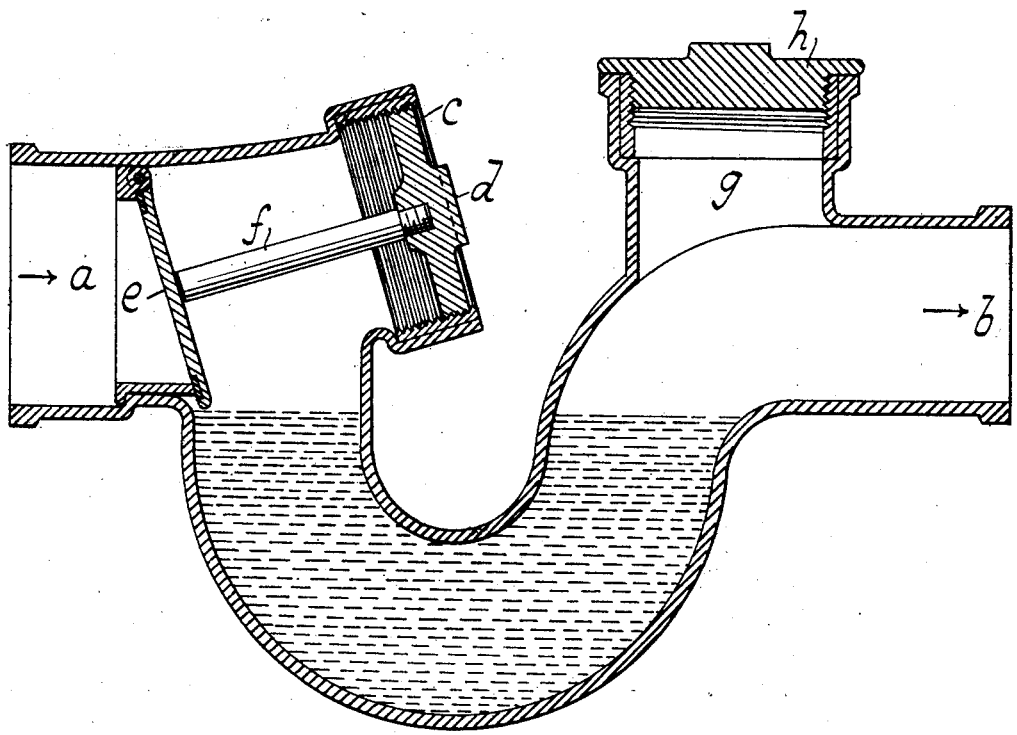
WITNESSES:
William Miller
Edward Wiesner
INVENTOR
George Cody
BY
W. C. Hauff
ATTORNEY

UNITED STATES PATENT OFFICE.

GEORGE CODY, OF FLUSHING, NEW YORK, ASSIGNOR TO LOUIS MUNZINGER, OF NEW YORK, N. Y.

SEWER BACKWATER AND TESTING TRAP.

No. 826,404.          Specification of Letters Patent.          Patented July 17, 1906.

Application filed January 20, 1905. Renewed April 4, 1906. Serial No. 309,885.

*To all whom it may concern:*

Be it known that I, GEORGE CODY, a citizen of the United States, residing at Flushing, in the county of Queens and State of New York, have invented new and useful Improvements in Sewer Backwater and Testing Traps, of which the following is a specification.

By means of this invention the system of pipes or drainage in a house back of a trap or valve can be tested to ascertain the presence of leaks. Such valve is also useful in preventing any backwater from flowing into the system.

This invention is set forth in the following specification and claims and illustrated in the annexed drawing, in which is shown a vertical section of a trap embodying this invention.

In this sewer-trap the flap or valve can be held in its closed position while the drainage system of the building is tested.

In the drawing, the letter $a$ designates the hub or inlet end, and $b$ is the spigot or outlet portion or end of a sewer-trap. The trap is also provided with an opening $c$ for the purpose of cleaning the interior of the trap. This opening or hand-hole is closed by a cover or screw-plug $d$. Located near the inlet in the interior of the trap is a valve $e$. To the said mentioned screw-plug is attached a stem $f$. The end thereof presses onto the valve to close the same and hold it closed and allow water or pressure test to be made. When the test has been made, the screw-plug can be removed and then the stem removed therefrom and plug replaced in its seat in the opening. The valve then acts as a back-pressure valve—that is to say, opens for discharge, but will close when there is back pressure from the outlet. The backwater-valve can be provided with a packing-ring or washer of soft material fastened to the flap or thimble.

The plug $d$ is tapped to allow the stem or its thread to be connected to and held by the plug to hold the valve closed during testing of the sewer or waste pipes or system in the house.

The means shown for holding the backwater-valve closed are simple and cheap. The hand-hole cover $d$ is adapted to hold the closing means or stem $f$, the trap or seat in the cover not passing entirely through the same, so that on removal of the stem the cover still forms an unbroken closure. At the same time this seat, extended partly through the cover, is adapted to hold the stem properly braced or pressed to the valve to hold the latter shut. The tap or screw-thread in the cover $c$ can, however, if desired, pass entirely therethrough and be closed by a screw plug or closure when the stem is removed.

The hand-hole when cover $d$ is removed gives access to the dip of the trap, as also to the valve located somewhat below and opposite the cover. A second hand-hole is shown at $g$, which can be suitably closed by a cover $h$, and which hole also gives access to the dip or trap.

When the backwater valve or flap is held shut, the system back of the valve can be filled with water to discover leaks. When not locked in its closed position, the valve permits discharge through the trap.

What I claim as my invention, and desire to secure by Letters Patent, is—

1. A sewer-trap having a backwater-valve, a hand-hole back of the valve, and a hand-hole cover provided with removable means extending only partially therethrough and fully inclosed within the trap when applied for maintaining the valve closed during testing.

2. A sewer-trap having a backwater-valve with a hinge connection to hold the valve at all times in engagement with the trap, and a hand-hole cover having a removable stem projecting solely from the inner portion thereof to engage and hold the valve closed.

3. A sewer-trap having a backwater-valve, a hand-hole back of the valve, and a hand-hole cover provided with means removably attached to the inner portion thereof for maintaining the valve closed during testing, the hand-hole cover being reseated in the hand-hole when the said means is removed therefrom.

4. A sewer-trap having a backwater-valve and a hand-hole in alinement with the said valve, a cover for the hand-hole having a seat extended partly thereinto from its inner side, and a projecting device having one end removably fitted into the said seat to engage the valve for maintaining the latter closed, the said devices being solely held by the cover within the trap.

5. A sewer-trap provided with a dip, a movable valve located at one of the terminals of the dip, hand-holes adjacent to the opposite terminals of the dip and located at the upper portion of the trap to give access to the latter and the valve, the hand-hole rendering the valve accessible being disposed at an angle to the remaining hand-hole and in alinement with the valve, and means for removably closing the hand-holes, the closing means for the hand-holes which gives access to the valve carrying a projecting device to engage the said valve.

6. A sewer-trap provided with a valve having a hinge connection at its upper portion and located adjacent to one of the terminals of the trap, a hand-hole located behind the valve and having a removable cover, and a spindle removably attached to the inner side of the hand-hole cover solely to engage the valve.

7. A sewer-trap having a backwater-valve, a hand-hole cover having an inner screw-threaded seat, and a projecting device removably fitted into the seat to engage the valve for maintaining the latter closed, the stem being wholly inclosed by the trap when applied.

8. A sewer-trap having a backwater flap-valve, and a hand-hole cover with spindle-carrying means for holding the valve closed, a spindle removably held by the cover solely within the trap and adjustable by the movement of the cover, said hand-hole being placed behind and made to face the valve so that the flap of the valve can be removed and replaced through this hand-hole through which the spindle extends.

In testimony whereof I have hereunto set my hand in the presence of two subscribing witnesses.

GEORGE CODY.

Witnesses:
GEORGE HULSBERG,
EDWARD WIESNER.